(12) United States Patent
Liao et al.

(10) Patent No.: US 6,462,937 B1
(45) Date of Patent: Oct. 8, 2002

(54) COMPUTER HAVING AN INTEGRATED GAMING CONTROL PAD

(75) Inventors: Reynold L. Liao, Austin; Jefferson Wirtz, Round Rock, both of TX (US)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 09/668,416

(22) Filed: Sep. 22, 2000

(51) Int. Cl.[7] .............................. G06F 1/16; H05K 7/12; B68G 5/00
(52) U.S. Cl. ....................... 361/680; 361/683; 248/111; 400/693
(58) Field of Search ................................ 361/683, 679, 361/680; 248/118, 118.1, 118.3, 918, 631; 400/715, 691, 693; 379/433, 437, 440

(56) References Cited

U.S. PATENT DOCUMENTS

| | | |
|---|---|---|
| 5,522,572 | 6/1996 | Copeland et al. |
| 5,547,154 | 8/1996 | Kirchhoff et al. |
| 5,596,481 | 1/1997 | Liu et al. |
| 5,596,482 | 1/1997 | Horikoshi |
| 5,724,224 | 3/1998 | Howell et al. |
| 5,775,822 | 7/1998 | Cheng |
| 6,040,977 | * 3/2000 | Hoffer ........................ 361/680 |
| 6,163,326 | * 12/2000 | Klein et al. ................. 361/683 |
| 6,175,488 | * 1/2001 | Seto et al. ................... 361/683 |
| 6,195,255 | * 2/2001 | Kim ............................ 361/683 |
| 6,336,614 | * 1/2002 | Kwitck ....................... 248/118 |
| 6,385,037 | * 5/2002 | Howell et al. .............. 361/683 |

FOREIGN PATENT DOCUMENTS

JP 6-83481 * 3/1994 ............. G06F/1/16

* cited by examiner

Primary Examiner—Darren Schuberg
Assistant Examiner—Lisa Lea-Edmonds
(74) Attorney, Agent, or Firm—Haynes and Boone, LLP

(57) ABSTRACT

A computer includes a base having an exterior surface. A keyboard includes input components mounted on a portion of the exterior surface. A palm rest area is adjacent the keyboard. At least one palm rest component is detachably mounted in the palm rest area. Auxiliary input components are mounted in the palm rest area adjacent the palm rest component.

21 Claims, 5 Drawing Sheets

COMPUTER HAVING AN INTEGRATED GAMING CONTROL PAD

BACKGROUND

The disclosures herein relate generally to computer systems and more particularly to a control pad provided in a palm rest.

Many users of portable computers use their computers for electronic gaming. However, use of the portable computer for electronic gaming requires auxiliary controls which must be interfaced with the computer. Thus, when travelling, for example, the auxiliary controls must be carried along as added baggage. This takes up space and can pose added inconvenience for users due to the added baggage and the added connect/disconnect time.

Some electronic games can be enjoyed by enabling existing keyboard controls. This is not ideal because of ergonomic and functional issues. Another attempt to overcome the limitations mentioned above was to miniaturize the game pads. However, even when miniaturized, they are external items which must be carried and managed by the user.

Various keyboard/palm pad arrangements have been proposed in the past to assist in user convenience. However, none of the known devices address the specific limitations noted above.

For example, in U.S. Pat. No. 5,522,572, a support apparatus has dual, or left and right, palm rests. The apparatus is positionable to support an item like a keyboard in various inclined positions. The dual palm rests are mounted separately on a common carriage that slides in a plane back and forth relative to a front edge of an item on the apparatus. The manner of mounting the palm rests permits each palm rest to swivel about a generally vertical swivel axis and, additionally, move about a hinge axis that extends in a plane generally perpendicular to the associated swivel axis. The palm rests are connected to sets of torsion springs or the like to normally bias the palm rests about both the swivel axes and the hinge axes for clamping.

U.S. Pat. No. 5,547,154, discloses a wrist rest assembly for use along the front edge of a device to be operated by a person's hands or fingers, such as in front of a computer keyboard, including an elongated base assembly on which is supported an elongated pad. The base assembly has a top portion supporting the pad, a bottom portion adapted to be supported on a horizontal surface, and structure that allows the top portion to be supported on the bottom portion with the top surface of the pad at two different distances above that horizontal surface by switching ends of the top portion with respect to the ends of the bottom portion.

Therefore, what is needed is to provide fully functioning auxiliary controls into the existing portable computer in a manner which does not require additional controls to be carried and or stored separately from the portable computer.

SUMMARY

One embodiment, accordingly, provides auxiliary controls to supplement the keyboard controls. To this end, a computer includes a base having an exterior surface. A keyboard includes input components mounted on a portion of the exterior surface. A palm rest area is provided adjacent the keyboard. A palm rest component is detachably mounted in the palm rest area. Auxiliary input components are mounted in the palm rest area adjacent the palm rest component.

A principal advantage of this embodiment is that the auxiliary input components are integrated into the existing computer so that additional or separate controls do not have to be carried and/or stored separately from the computer.

DETAILED DESCRIPTION

Figure 1:
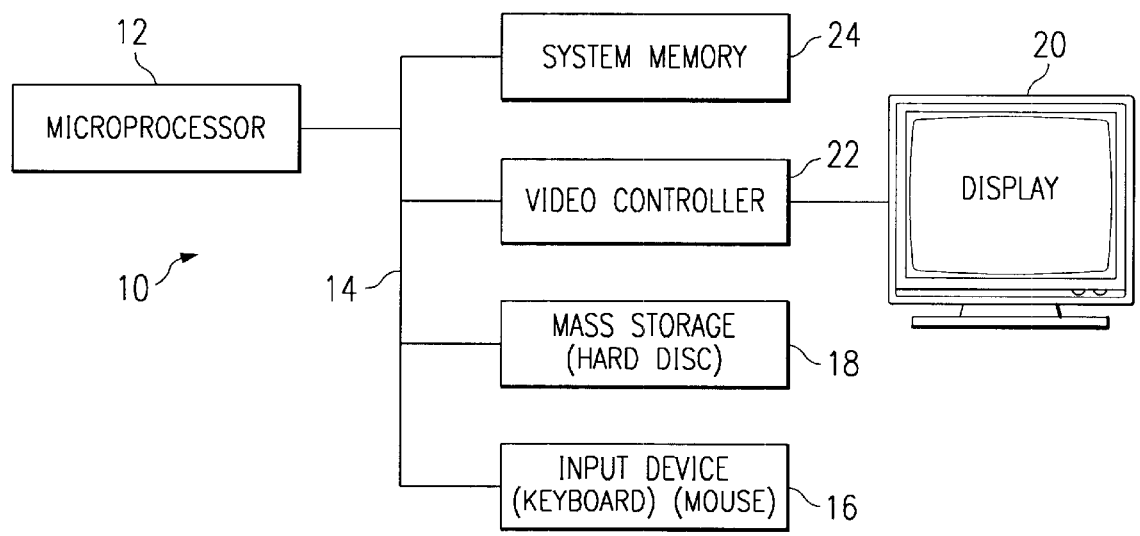
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
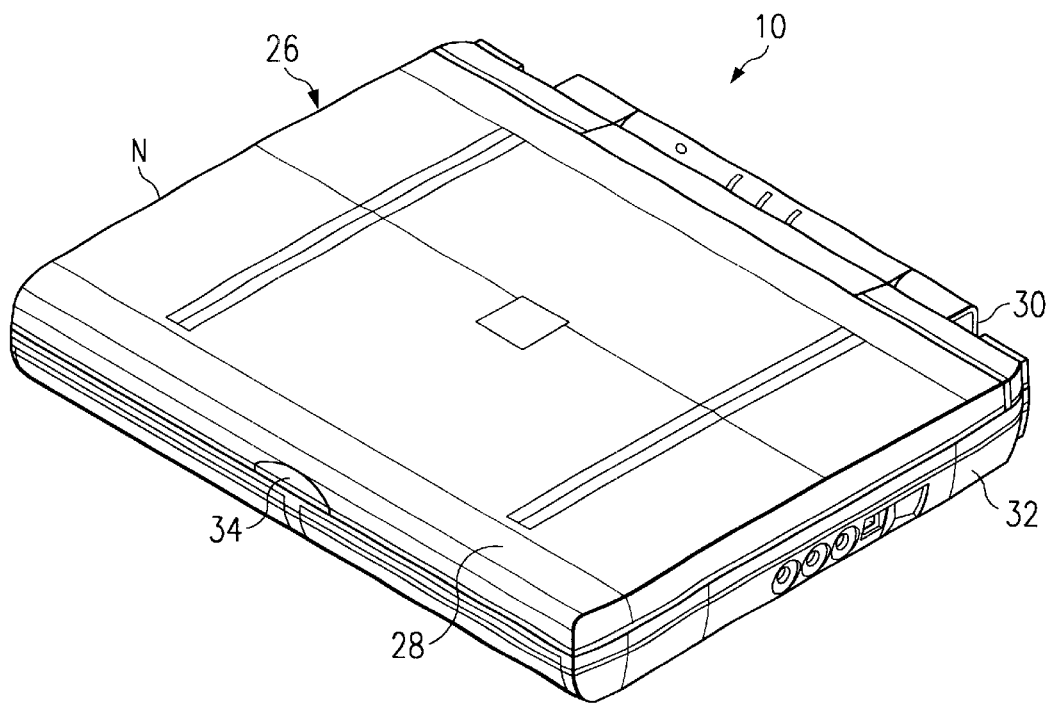
FIG. 2 is a perspective view illustrating an embodiment of a portable laptop computer having a lid in a closed position.
Figure 3:
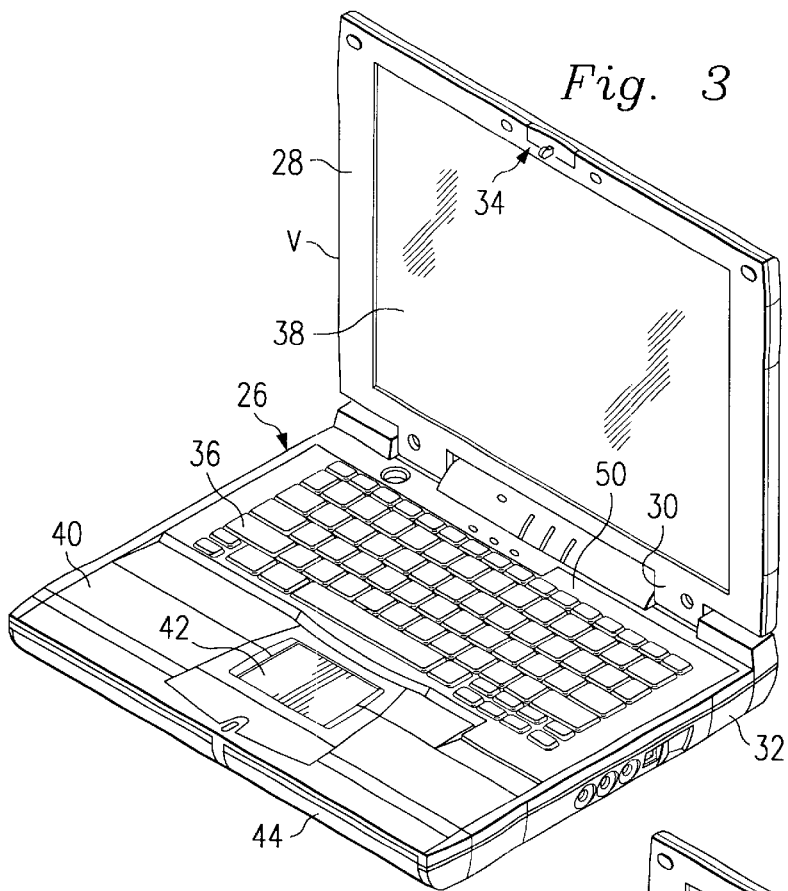
FIG. 3 is a perspective view illustrating an embodiment of a portable laptop computer having the lid in an open position.

Referring to FIG. 2, illustrated is a portable, notebook size computer designated 26 comprising a self-contained system, such as that illustrated at 10 in FIG. 1, and including a hinged top or lid 28 rotable about a hinge or hinges 30 from a nested position, "N," with a horizontal chassis base 32, to a substantially vertical or open position "V," FIG. 3. Opening of the notebook style portable computer by manipulation of a latch 34, reveals a plurality of input components such as a keyboard of keys 36 on base 32, and a monitor screen 38 mounted in lid or top 28. Base 32 includes a palm or wrist rest area 40 including an input area 42 of the input system 16 positioned above a battery housing 44 and adjacent keys 36. Base 32 includes an exterior surface 50. The keyboard keys 36 and also the adjacent palmrest area 40 are provided on the exterior surface 50.

Figure 4:
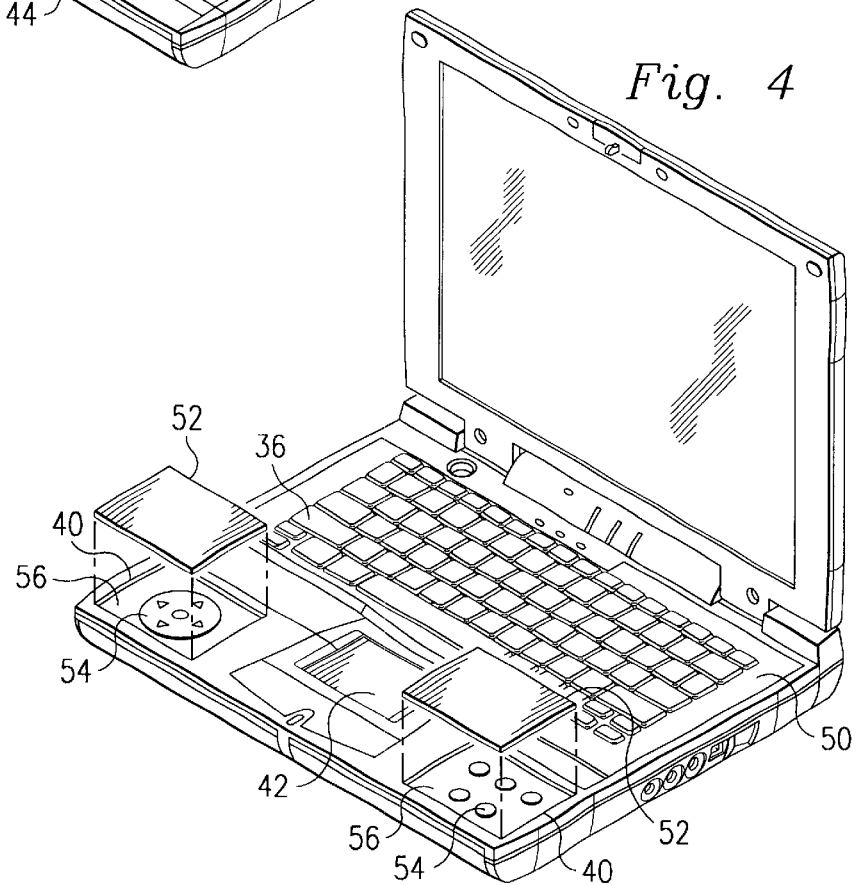
FIG. 4 is a perspective view illustrating an embodiment of a portable laptop computer having input components provided in a recessed surface.

In one embodiment, FIG. 4, at least one, and preferably two palmrest components 52 are detachably mounted in the palmrest area 40. A plurality of auxiliary input components 54 are mounted in the palmrest area 40 adjacent the palmrest components 52. The palmrest area 40 is recessed into the exterior surface 50. The recessed palmrest area 40 includes a recessed surface 56 and the auxiliary input components 54 are mounted in the recessed surface 56. The palmrest components 52 are provided to be seated in the recessed surface 56, and conceal the auxiliary input components 54. Components 52 may be reversible.

Figure 5:
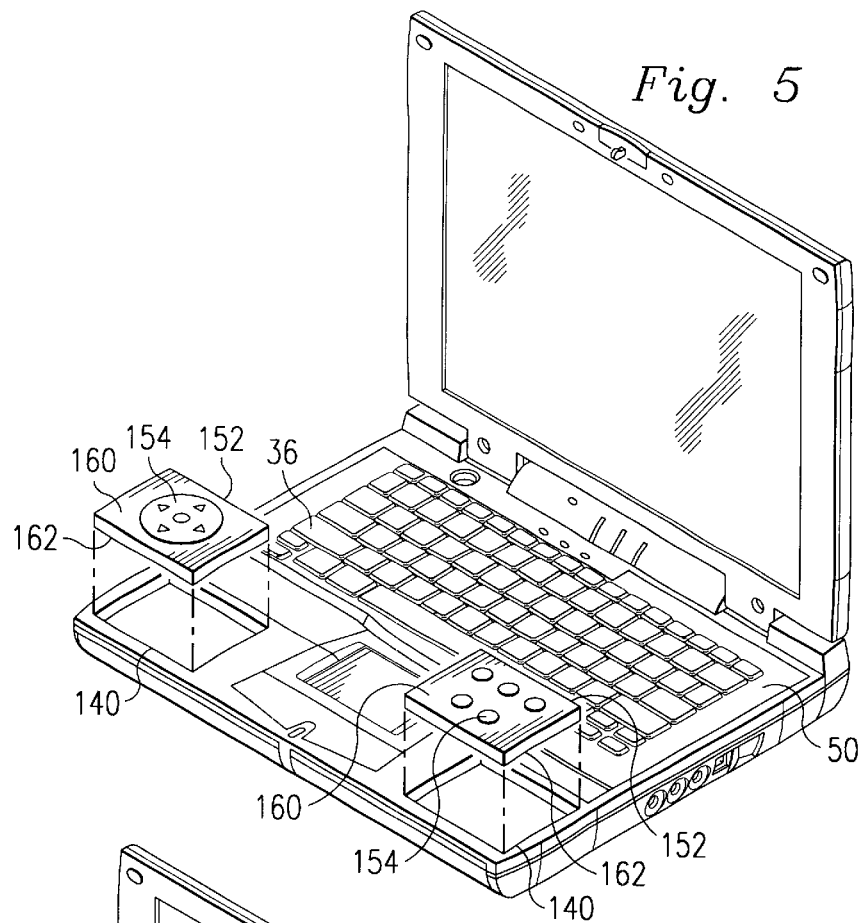
FIG. 5 is a perspective view illustrating an embodiment of a portable laptop computer having input components provided in the palmrest components.

In another embodiment, FIG. 5, a pair of palmrest components 152 are provided to be seated in a pair of corresponding recessed palmrest areas 140. Each palmrest component 152 includes a first surface 160, and a second surface 162, opposite the first surface 160. A plurality of auxiliary input components 154 are mounted in one of the first and second surfaces 160, 162, respectively. In this manner, the palmrest components 152 are reversibly mounted in the palmrest areas 140 to alternately expose one of the respective first and second surfaces 160, 162.

Figure 6:
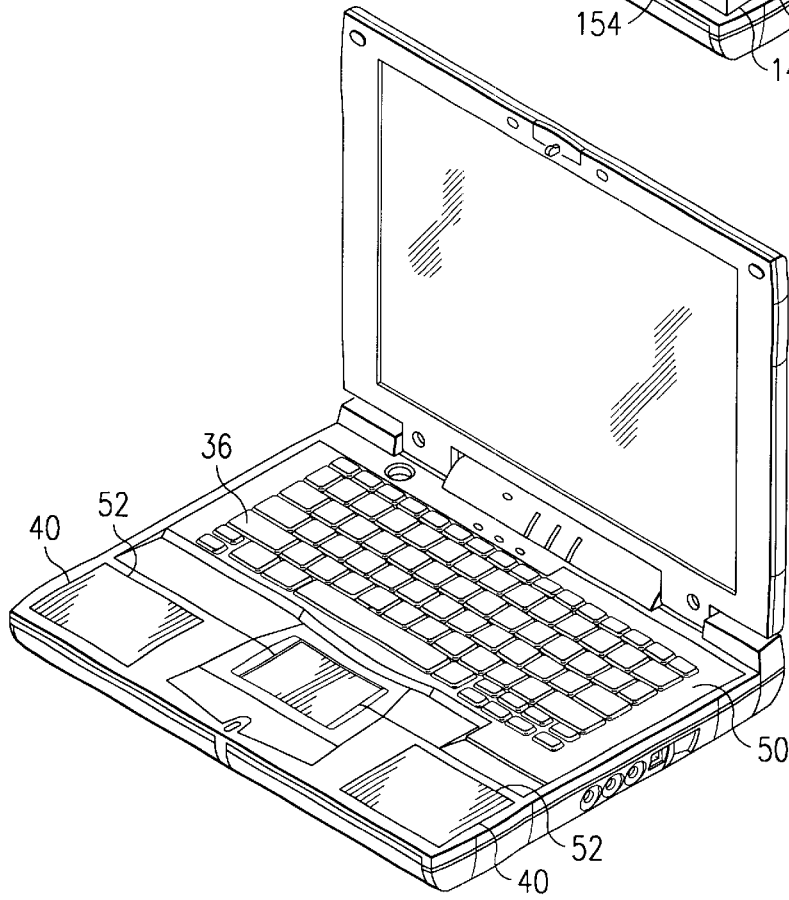
FIG. 6 is a perspective view illustrating the computer of FIG. 4, having palmrest components mounted on the recessed surface.

In the embodiment of FIG. 4, where the auxiliary input components 54 are mounted in the recessed surface 56, the palmrest components 52 are seated in the recessed palmrest area 40, FIG. 6, so as to conceal the auxiliary input components 54 when the components 54 are not in use.

Figure 7:
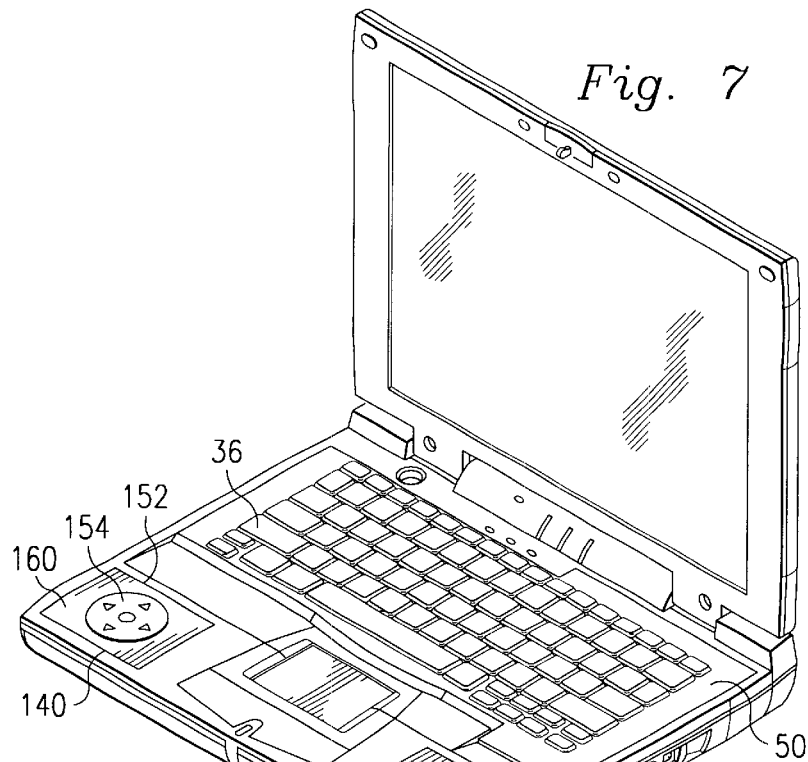
FIG. 7 is a perspective view illustrating the computer of FIG. 5, having the palmrest components mounted on the recessed surface so that the input components are exposed.
Figure 8:
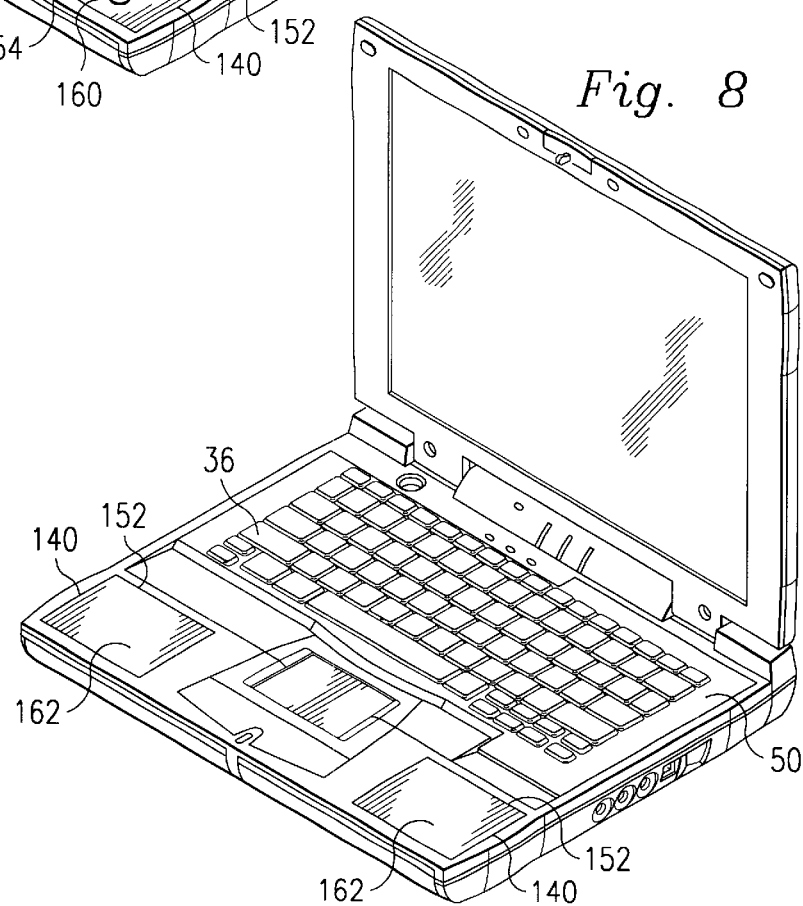
FIG. 8 is a perspective view illustrating the computer of FIG. 7, having the palmrest components mounted on the recessed surface so that the input components are inverted.

In the embodiment of FIG. 5, where each palmrest component 152 has a first surface 160 which includes the auxiliary input components 154, the palmrest components 152 can be seated in the recessed palmrest area 140, FIG. 7, so that the first surface 160 of the auxiliary input components 154 is exposed in an upright position. Alternately, when the auxiliary input components 154 are not in use, the palmrest components 152 can be reversibly seated in the recessed palmrest areas 140, FIG. 8, so that the second surface 162 is exposed in an upright position and the first surface is 160 is inverted and seated in the recessed palmrest area 140.

The exterior surface 50 of the computer 10 is formed of a plastic or metal material of a certain commercial color and texture, such as black, gray or charcoal. The palmrest components 52, 152 may be formed of the same material and color as the exterior surface 50, but are preferably formed of a different material having a more ergonomically pleasing texture, i.e. foam, gel filled, rubber, leather, vinyl, etc. and a more aesthetically pleasing color. The aspects of color and texture may be customer configured by customer specified order. Also, the auxiliary input components 154 may be customer configured as well.

Figure 9:
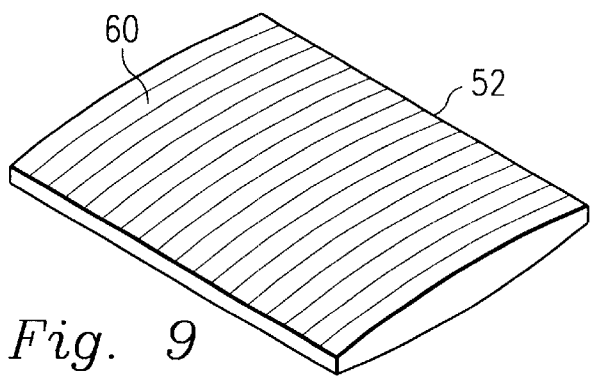
FIGS. 9–12 are perspective views of embodiments of palmrest components of different colors, textures and materials.
Figure 10:
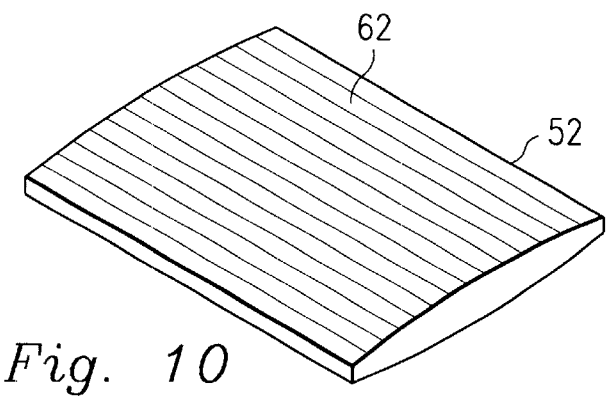
Figure 11:
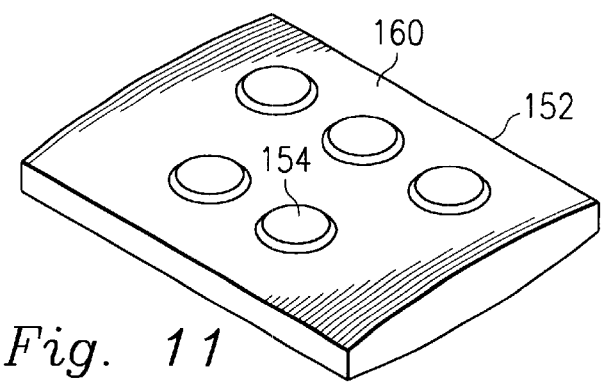
Figure 12:
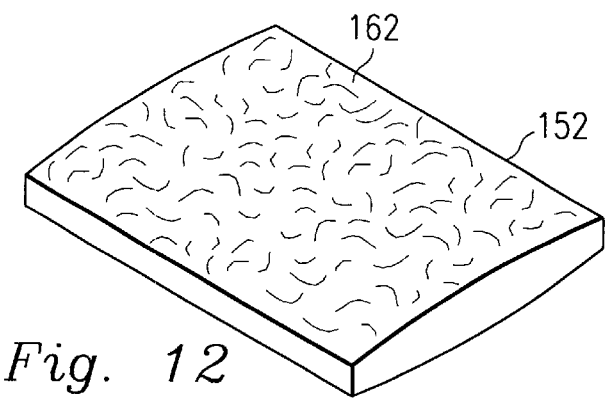

Furthermore, each palmrest component 52, FIGS. 9 and 10, may be of a first material, color, texture on a first side 60, and may be of a second material, color, texture on a second opposite side 62. Also, each palmrest component 152, FIGS. 11 and 12, may be of a first material, color, texture on the first side 160, and may be of a second material, color, texture on the second opposite side 162.

For example, component 52, FIG. 9, may be foam filled including side 60 covered in a red vinyl, and side 62 of component 52, FIG. 10, may be covered in a blue vinyl. Side 160 of component 152, FIG. 11, may be a gray plastic or coated metal, whereas side 162 of component 152, FIG. 12, may be a brown leather.

As can be seen, the principal advantages of these embodiments are that the auxiliary input components are integrated into the existing computer so that additional or separate controls do not have to be carried and/or stored separately from the computer. The portable computer includes a fully functional integrated game pad in the palm rest. The game pad can either be permanently built into the palm rest or can be made to be removable. When the user wants to play a game on the portable computer, the game pad is used instead of the keyboard. This provides a more compact carrying package, and offers an ergonomic enhancement over gaming through the keyboard.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer comprising:
   a base having an exterior surface;
   a keyboard including input components mounted on a portion of the exterior surface;
   a palm rest area adjacent the keyboard;
   at least one palm rest component detachably mounted in the palm rest area; and
   a plurality of auxiliary input components mounted in the palm rest area adjacent the palm rest component.

2. The computer as defined in claim 1 wherein the palm rest area is recessed into the exterior surface.

3. The computer as defined in claim 2 wherein the recessed palm rest area includes a recessed surface.

4. The computer as defined in claim 3 wherein the auxiliary input components are mounted in the recessed surface.

5. The computer as defined in claim 4 wherein the palm rest component is seated in the recessed palm rest area and conceals the auxiliary input components.

6. The computer as defined in claim 1 wherein the exterior surface is formed of a first material and the palm rest component is formed of a second material different from the first material.

7. The computer as defined in claim 1 wherein the exterior surface is formed of a first material having a first color, and the palm rest component is formed of a second material different from the first material, and having a second color different from the first color.

8. The computer as defined in claim 1 wherein the exterior surface is formed of a first material having a first texture, and the palm rest component is formed of a second material different from the first material, and having a second texture different from the first texture.

9. The computer as defined in claim 1 wherein the palm rest area includes a pair of separated palm rest areas each including a recessed surface.

10. The computer as defined in claim 9 wherein each recessed surface includes auxiliary input components.

11. The computer as defined in claim 10 wherein a palm rest component is seated in each recessed palm rest area and conceals the auxiliary input components.

12. The computer as defined in claim 3 wherein the palm rest component is seated in the recessed palm rest area.

13. The computer as defined in claim 12 wherein the palm rest component includes a first surface and a second surface opposite the first surface.

14. The computer as defined in claim 13 wherein the auxiliary input components are mounted in one of the first and second surfaces, and a textured palm rest is formed on the other of the first and second surfaces, whereby the palm rest component is reversibly mounted in the recessed palm rest area to alternately expose one of the first and second surfaces.

15. A computer system comprising:
    a chassis having an exterior surface;
    a microprocessor mounted in the chassis;
    a storage coupled to the microprocessor;
    a video controller coupled to the microprocessor;
    a memory coupled to provide storage to facilitate execution of computer programs by the microprocessor;
    a keyboard including input components mounted on a portion of the exterior surface;
    a palm rest area adjacent the keyboard;
    at least one palm rest component detachably mounted in the palm rest area; and
    a plurality of auxiliary input components mounted in the palm rest area adjacent the palm rest component.

16. The computer system as defined in claim 15 wherein the auxiliary input components are mounted on one side of the palm rest component, and a textured palm rest is formed on another side of the palm rest component, opposite the one side.

17. The computer system as defined in claim 15 wherein the palm rest component is seated in the palm rest area and conceals the auxiliary input components.

18. A customer configured portable computer comprising:
    a base having an exterior surface;
    a keyboard including input components mounted on a portion of the exterior surface;
    a palm rest area adjacent the keyboard;
    at least one customer configured palm rest component detachably mounted in the palm rest area; and
    a plurality of customer configured auxiliary input components mounted in the palm rest area adjacent the palm rest component.

19. The computer system as defined in claim 18 wherein the auxiliary input components are mounted on one side of the palm rest component, and the textured palm rest is formed on another side of the palm rest component, opposite the one side.

20. The computer system as defined in claim 18 wherein the palm rest component is seated in the palm rest area and conceals the auxiliary input components.

21. A method of providing game controls for a portable computer comprising:
    forming a base having an exterior surface;
    mounting a keyboard on a portion of the exterior surface, the keyboard including input components;
    providing a palm rest area adjacent the keyboard;
    detachably mounting at least one palm rest component in the palm rest area; and
    mounting auxiliary input components in the palm rest area adjacent the palm rest component.

* * * * *